United States Patent [19]

Payrhammer et al.

[11] 4,094,604
[45] June 13, 1978

[54] APPARATUS FOR DETERMINING THE LIGHT TRANSMISSIVITY OF FILM FRAMES OR THE LIKE

[75] Inventors: Bernd Payrhammer; Helmut Treiber, both of Munich, Germany

[73] Assignee: Agfa-Gevaert Aktiengesellschaft, Leverkusen, Germany

[21] Appl. No.: 829,786

[22] Filed: Sep. 1, 1977

[30] Foreign Application Priority Data

Sep. 9, 1976 Germany .............................. 2640681

[51] Int. Cl.² .............................................. G03B 27/78
[52] U.S. Cl. .......................................... 355/68; 355/38
[58] Field of Search ...................... 355/32, 132, 18, 77, 355/35, 38, 67–71

[56] References Cited

U.S. PATENT DOCUMENTS

| | | | |
|---|---|---|---|
| 3,049,967 | 8/1962 | Duerr ...................................... | 355/38 |
| 3,677,641 | 7/1972 | King et al. .......................... | 355/68 X |
| 3,708,676 | 1/1973 | Huboi et al. ........................ | 355/38 X |
| 3,790,275 | 2/1974 | Huboi et al. ............................ | 355/68 |
| 4,017,179 | 4/1977 | Poné et al. ............................ | 355/68 |

*Primary Examiner*—Donald A. Griffin
*Attorney, Agent, or Firm*—Peter K. Kontler

[57] ABSTRACT

Apparatus for the determination of light transmissivity of film frames preparatory to the making of prints in a copying machine has a plate-like locating device for successive film frames, a light source at one side of the locating device, a group of photosensitive signal-generating elements at the other side of the locating device, and a diaphragm which is interposed between the locating device and photosensitive elements and has a hollow truncated pyramid, plate-like partitions and tubular components which confine light passing through the film frame on the locating device in such a way that a centrally located photosensitive element receives light from the entire film frame and all of the light which has passed through the central field of the frame, whereas each of the other photosensitive elements receives only that light which has passed through a single one of four L-shaped peripheral fields surrounding the central field of the frame. Light which reaches the centrally located element passes through the pyramid as well as around the pyramid. On the other hand, light which reaches the other photosensitive elements passes from the corresponding peripheral fields and thereupon through the tubular components of the diaphragm. Consequently, the signal which is transmitted by the centrally located element is indicative of transmissivity of the entire frame, and the signals transmitted by the other elements are indicative solely of transmissivity of the respective peripheral frames.

10 Claims, 6 Drawing Figures

APPARATUS FOR DETERMINING THE LIGHT TRANSMISSIVITY OF FILM FRAMES OR THE LIKE

BACKGROUND OF THE INVENTION

The present invention relates to apparatus for measuring the light transmissivity (transparency) of exposed and developed photographic films or the like. More particularly, the invention relates to apparatus for measuring the light transmissivity of exposed and developed film frames prior to the making of prints of such frames in a color printing or like copying machine. Still more particularly, the invention relates to improvements in apparatus for measuring the transmissivity of peripherally disposed background portions of originals to be copied, i.e., of portions which surround the centrally disposed subject portion of an original.

It is already known to depart from integral light measurement of originals, i.e., to control the operation of automatic photographic printers on the basis other than the neutral grey principle. Reference may be had to U.S. Pat. No. 3,708,676 granted Jan. 2, 1973 to Huboi et al. As a rule, one attempts to collect or group together those originals which exhibit identical or similar distribution of density, i.e., which can be exposed with the same setting of controls at the copying station. U.S. Pat. No. 3,790,275 granted (Feb. 5, 1974 to Huboi et al. proposes to use discrete radiation sensitive devices for receiving radiation from the upper portion of the peripheral zone of an original, from the lower portion of the peripheral zone, and from the centrally disposed portion of the original. The patentees further propose to determine the average light transmissivity of the entire original to allow for grouping of the original with originals exhibiting the same or similar average transmissivity.

The means for measuring the transmissivity of originals includes an optical system which images the original onto a raster of radiation-sensitive photoelectric transducers which transmit signals to a computer. The central portion of the raster includes a plurality of radiation sensitive devices which sense radiation derived from a plurality of discrete sub-portions of the subject portion of the original. This enables the apparatus to ascertain that discrete sub-portion of the central portion of the original having the greatest or maximum transmissivity. The patented apparatus is incapable of ascertaining the total light transmissivity of originals.

Another conventional apparatus employs a lens which projects the image of the original into the plane of a rotating diaphragm. The diaphragm has a plurality of different holes (including U-shaped holes) which allow light passing therethrough (i.e., light which has passed through different portions of the original including the upper and lower portions of the peripheral zone) to impinge upon a photoelectric transducer. Such apparatus exhibit the drawback that signals denoting the characteristics of different portions of an original are produced at timely spaced intervals, i.e., the signals must be stored prior to transmission to the evaluating circuit which must receive all signals at the same time. Moreover, the apparatus are complex and expensive because they employ moving parts and must be equipped with means for synchronizing the movement of diaphragm with the operation of signal storing means.

OBJECTS AND SUMMARY OF THE INVENTION

An object of the invention is to provide a novel and improved apparatus for the measurement of light transmissivity of exposed and developed film frames or other types or originals to be copied in a color photographic printer or the like.

Another object of the invention is to provide an apparatus which can furnish simultaneous signals denoting the light transmissivity of all fields of an original so that the apparatus need not be equipped with a signal storing unit.

A further object of the invention is to provide an apparatus which can accurately determine the light transmissivity of a large number of discrete portions or fields of an original.

An additional object of the invention is to provide novel light confining and directing means for use in an apparatus of the above outlined character.

The invention is embodied in an apparatus for determining the light transmissivity of film frames or other originals of the type wherein a central field of the image to be reproduced on photographic paper or the like is surrounded by a plurality of peripheral fields (preferably four L-shaped peripheral fields). The apparatus comprises means for locating an original in a predetermined plane, means for directing light against one side of the original which is located in the aforementioned plane (the light directing means may comprise a light source and a light dispersing device interposed between the light source and the original in or on the locating means), a plurality of signal-generating photosensitive elements at the other side of the plane of the original (preferably one for each of the fields), and a diaphragm which is interposed between the plane of the original and the photosensitive elements. In accordance with a feature of the invention, the diaphragm includes means (e.g., a hollow truncated pyramid) for confining light passing through the central field of the original in the locating means to impinge solely upon the associated photosensitive element, and means (e.g., open-ended tubular components) for confining light passing through the peripheral fields of the original in the locating means to impinge solely upon the associated photosensitive elements as well as upon the element which is associated with the central field. In other words, the photosensitive element which is associated with the central field receives light from all fields of an original in the locating means but the photosensitive elements which are associated with the peripheral fields receive light only from the respective peripheral fields.

The diaphragm preferably further comprises partitions which extend outwardly from the pyramid in line with the (imaginary) boundaries between neighboring peripheral fields. The base of the pyramid faces the central field of the original and the top of the pyramid is in line with the associated photosensitive element. The distance between the top of the pyramid and the associated element preferably equals or approximates the height of the pyramid, i.e., the distance between the base and the top. The base of the pyramid is preferably closely adjacent to the plane of the original in the locating means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
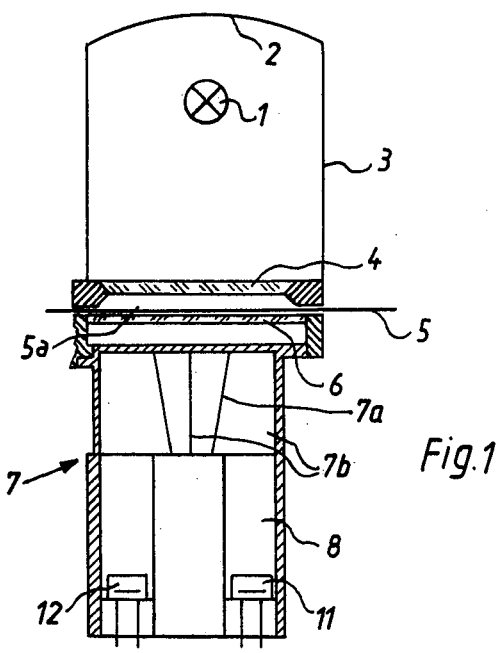
FIG. 1 is a schematic partly elevational and partly central vertical sectional view of an apparatus which embodies the invention.

FIG. 1 shows an apparatus which includes a light source 1 located in front of a reflector 2 and installed in a lamp housing 3 which may constitute a mirrored duct for the passage of light toward a light dispersing pane 4. The original 5a, i.e., one frame of an exposed and developed photographic film 5, is located in front of and is uniformly illuminated by light passing through the pane 4. Suitable means of conventional design (not shown in the drawing) are provided to place successive frames 5a of the film into exact register with the pane 4.

The frame 5a which registers with the pane 4 is held in a predetermined plane by a locating means including a glass plate 6 which is disposed above a diaphragm 7. The diaphragm determines the origin of light which impinges upon a set of photosensitive elements 10 to 13.

Figure 2:
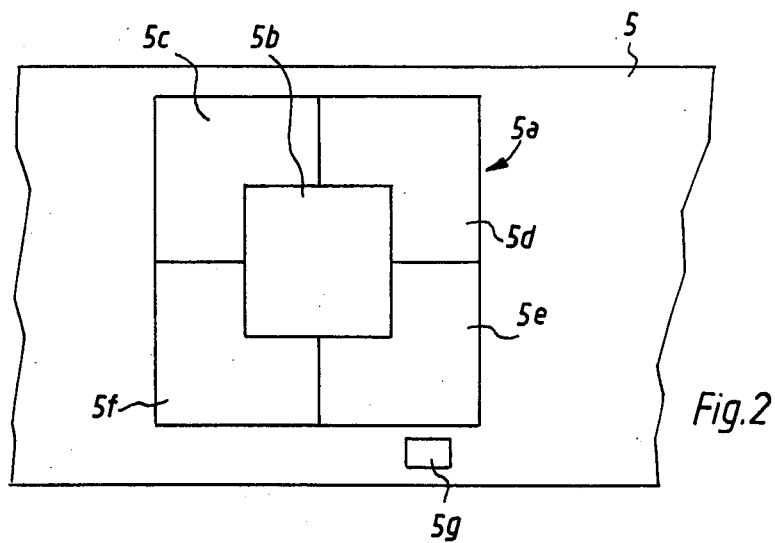
FIG. 2 is an enlarged plan view of an original.

FIG. 2 shows the imaginary subdivision of a frame 5a into several portions or fields including a square central or subject field 5b and four L-shaped peripheral fields 5c, 5d, 5e and 5f. The film 5 has a perforation 5g which is adjacent to the illustrated frame 5a and can be detected by a suitable sensor, not shown, forming part of means for positioning successive frames of the film 5 in exact register with the pane 4 and diaphragm 7.

In order to accurately determine the amount of printing light which is needed for satisfactory exposure of film frame 5a at the copying station of the printer, it is necessary to separately determine the average light transmissivity of each of the four peripheral fields 5c to 5f. Furthermore, it is necessary to determine the light transmissivity value for the entire frame 5a, preferably in a single color (the frame 5a is assumed to form part of an exposed and developed color film).

Figure 3:
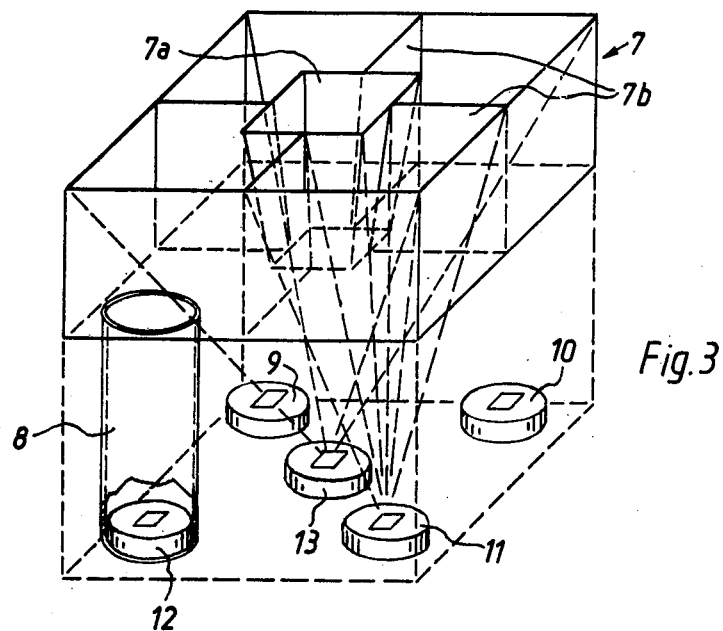
FIG. 3 is a perspective view of the diaphragm and of the photosensitive elements.
Figure 4:
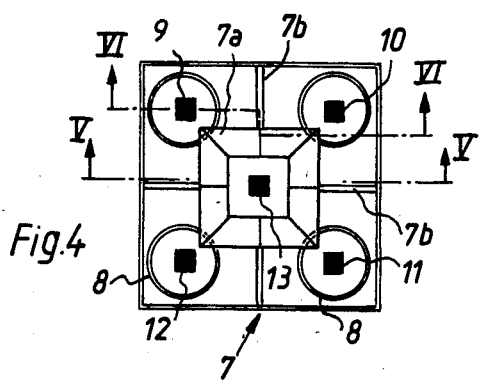
FIG. 4 is a smaller-scale plan view of the structure shown in FIG. 3.

The elements 9, 10, 11 and 12 (see FIGS. 3 and 4) are transducers receiving light which has respectively passed through the L-shaped fields 5c-5f of the frame 5a. The outputs of these elements transmit corresponding signals to a suitable evaluating circuit, not shown. The centrally located element 13 receives light which has passed through the central or subject field 5b of the frame 5a in register with the pane 4 as well as some light which has passed through the fields 5c-5f.

The diaphragm 7 comprises confining means for preventing light from straying so as to impinge upon other than predetermined photosensitive elements of the transmissivity measuring system. Such confining means includes open-ended tubular components 8 which are remote from the frame 5a (i.e., nearer to the elements 9-13) and a central component 7a which is disposed between the components 8 and glass plate 6 and resembles the frustum of a hollow four-sided pyramid tapering toward the element 13. The base of the pyramid 7a is in register with the central field 5b and is close to the plane of film frame 5a on the plate 6, and the top of the pyramid is in line with the central portion of the light-sensitive surface of the element 13. The height of the pyramid 7a is a fraction (at most one half) of the distance between the frame 5a and the element 13.

The pyramid 7a is surrounded by four equidistant outwardly extending partitions 7b which divide the peripheral portion of the upper part of the diaphragm 7 into four L-shaped compartments each in register with one of the L-shaped fields 5c-5f. The pyramid 7a prevents straying of light from the central field 5b onto the sensitive surfaces of the elements 9-12, and the partitions 7b prevent straying of light from L-shaped fields 7c-7f onto the sensitive surfaces of wrong elements 9-12. In other words, the diaphragm 7 insures that the element 13 is exposed to light which has passed through the field 5b and that the transducers 9-12 receive only such light which has passed through the corresponding (i.e., associated) L-shaped peripheral fields 5c-5f. If one were to place the frame 5a of FIG. 2 on top of the array of transducers shown in FIG. 4, light passing through the fields 5c, 5d, 5e, 5f would respectively impinge upon the sensitive surfaces of elements 9, 10, 11, 12.

The components 8 of the diaphragm 7 are circular cylindrical tubes which register with the elements 9-12. The height of the tubes 8 is preferably such that they extend close to or into contact with the partitions 7b. The inner diameter of each tube 8 equals or approximates one-half the distance between the centers of two neighboring peripheral photosensitive elements, e.g., between the elements 9 and 10.

Figures 5, 6:
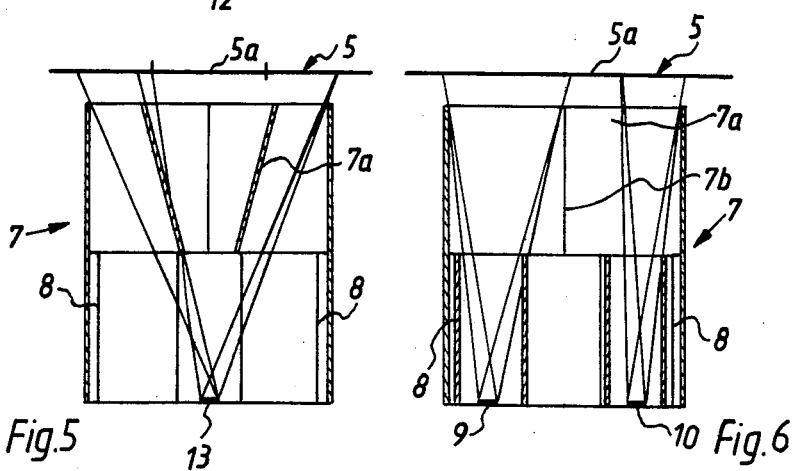
FIG. 5 is a sectional view as seen in the direction of arrows from the line V—V of FIG. 4.
FIG. 6 is a sectional view as seen in the direction of arrows from the line VI—VI of FIG. 4.

The function of the diaphragm 7 will be understood by looking at FIGS. 5 and 6. The centrally located element 13 receives light which has passed through the central field 5b as well as some light which has passed through the L-shaped fields 5c-5f. The light rays which pass through the fields 5c-5f and impinge upon the transducer 13 travel in the space around the pyramid 7a (i.e., between the partitions 7b) and their inclination is such that light passing through 5c-5f and impinging upon 13 is not weakened to an appreciable extent, i.e., the paths of such light rays are nearly normal to the sensitive surface of the element 13.

FIG. 6 shows that the element 9 receives only such light which has passed through the field 5c, and the elements 10, 11, 12 receive only light which has passed through the fields 5d, 5e, 5f. In other words, light which has passed through any one of the four peripheral fields 5c-5f cannot stray onto any of the non-associated elements (in the case of light which has passed through the field 5c, such light cannot stray onto the elements 10, 11 and 12).

The material of the funnel 7a, partitions 7b and tubes 8 is preferably thin, and the inner surfaces of parts 7a, 8 preferably diffuse and reflect light. Both surfaces of each partition 7b preferably reflect light. The selection of relatively thin material for the parts 7a, 7b and 8 insures that the boundaries between the fields 5b-5f are hardly discernible, i.e., that the apparatus measures the transmissivity of the entire frame 5a.

The illustrated photosensitive elements 9-13 can be replaced with photoresistors or other types of light-sensitive elements. It is further possible to replace the illustrated tubes 8 with shorter tubes of smaller diameter without departing from the spirit of the invention. The distance between the upper edge of the pyramid 7a and the plate 6 depends on the light dispersing characteristics of the pane 4. If the dispersing effect is very pronounced, the diaphragm 7 is moved nearer to the plate 6.

One or more filters can be placed between the top of the pyramid 7a and the element 13 or between the base of the pyramid and the central field 5b. This insures that the element 13 is exposed to light of a selected color.

The improved apparatus exhibits the important advantage that it can be readily converted for determination of transmissivity in the upper and lower peripheral zones, regardless of whether the frames 5a are upright or horizontal. The conversion can be effected automatically, for example, when the average brightness of the field 5c deviates considerably from average brightness of the field 5d, when the average brightness of the field 5e deviates considerably from average brightness of the field 5f but the average brightness of the field 5c matches or approximates that of the field 5f and the average brightness of field 5d matches or approximates that of the field 5e. This is a strong indication that the original overlying the plate 6 is an upright frame, i.e., that it is desirable to resort to a different combination of signals which are transmitted by the light sensitive elements.

The signals from elements 9-13 can be transmitted to logarithmic amplifiers so that the signals furnished by such amplifiers denote the density (rather than transmissivity) of the respective fields.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. Apparatus for determining the light transmissivity of film frames or other originals of the type wherein a central field is surrounded by a plurality of peripheral fields, comprising means for locating an original in a predetermined plane; means for directing light against one side of the original in said plane; a plurality of signal-generating photosensitive elements at the other side of said plane, one for each of said fields; and a diaphragm interposed between said plane and said elements, said diaphragm including means for confining light passing through the central field of the original in said plane to impinge solely upon the associated element and for confining light passing through the peripheral fields of the original in said plane to impinge solely upon the elements which are associated with the respective peripheral fields as well as upon the element which is associated with said central field.

2. Apparatus as defined in claim 1, wherein said confining means includes a hollow truncated pyramid having a base facing the central field of the original in said plane and a top in line with the associated photosensitive element.

3. Apparatus as defined in claim 2, wherein said top is spaced apart from said last mentioned element by a distance approximating that between the base and top of said pyramid.

4. Apparatus as defined in claim 2, wherein said base is closely adjacent said plane.

5. Apparatus as defined in claim 1, wherein said confining means comprises hollow tubular components, one for each peripheral field of the original in said plane and each in register with the photosensitive element which is associated with the respective peripheral field, each tubular component having a first open end receiving light from the respective peripheral field and a second open end through which light passes to impinge upon the respective element.

6. Apparatus as defined in claim 5, wherein said confining means further comprises a hollow truncated pyramid disposed between said plane and said tubular components, said pyramid having a base facing the central field of the original in said plane and a top in line with the associated photosensitive element.

7. Apparatus as defined in claim 6, wherein said confining means further comprises partitions extending outwardly from said pyramid in line with the boundaries between the peripheral fields of the original in said plane.

8. Apparatus as defined in claim 1, wherein the number of photosensitive elements associated with said peripheral fields equals four and each of said peripheral fields constitutes a substantially L-shaped portion of the original in said plane.

9. Apparatus as defined in claim 1, wherein said light directing means comprises a light source and a light dispersing device interposed between said source and the original in said plane.

10. Apparatus as defined in claim 1, wherein said confining means includes light reflecting components.

* * * * *